Dec. 22, 1953   J. E. RODE   2,663,237
COTTON CHOPPING MACHINE
Filed Dec. 29, 1949   4 Sheets-Sheet 1
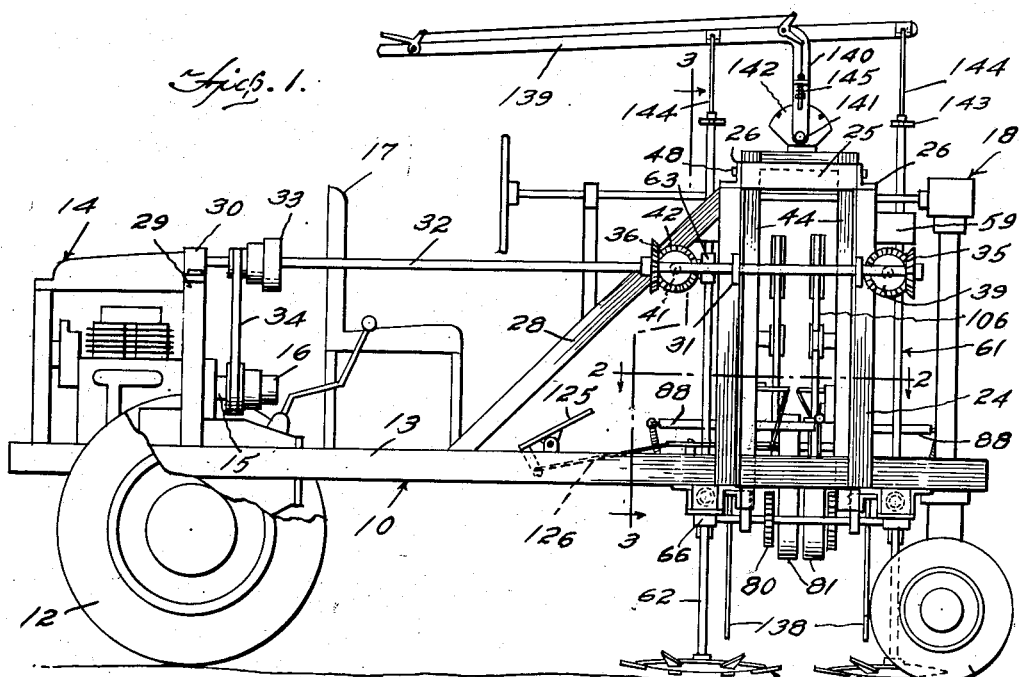
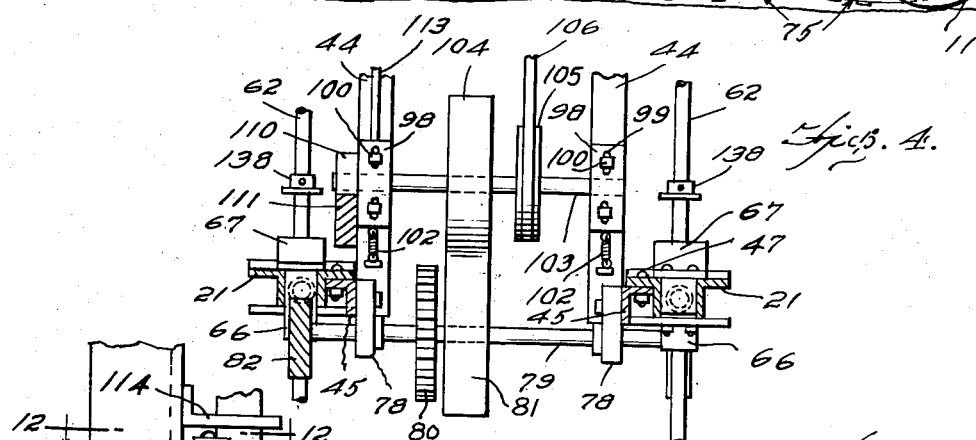
INVENTOR.
John E. Rode
BY
Wilfred E. Lawson
ATTORNEY

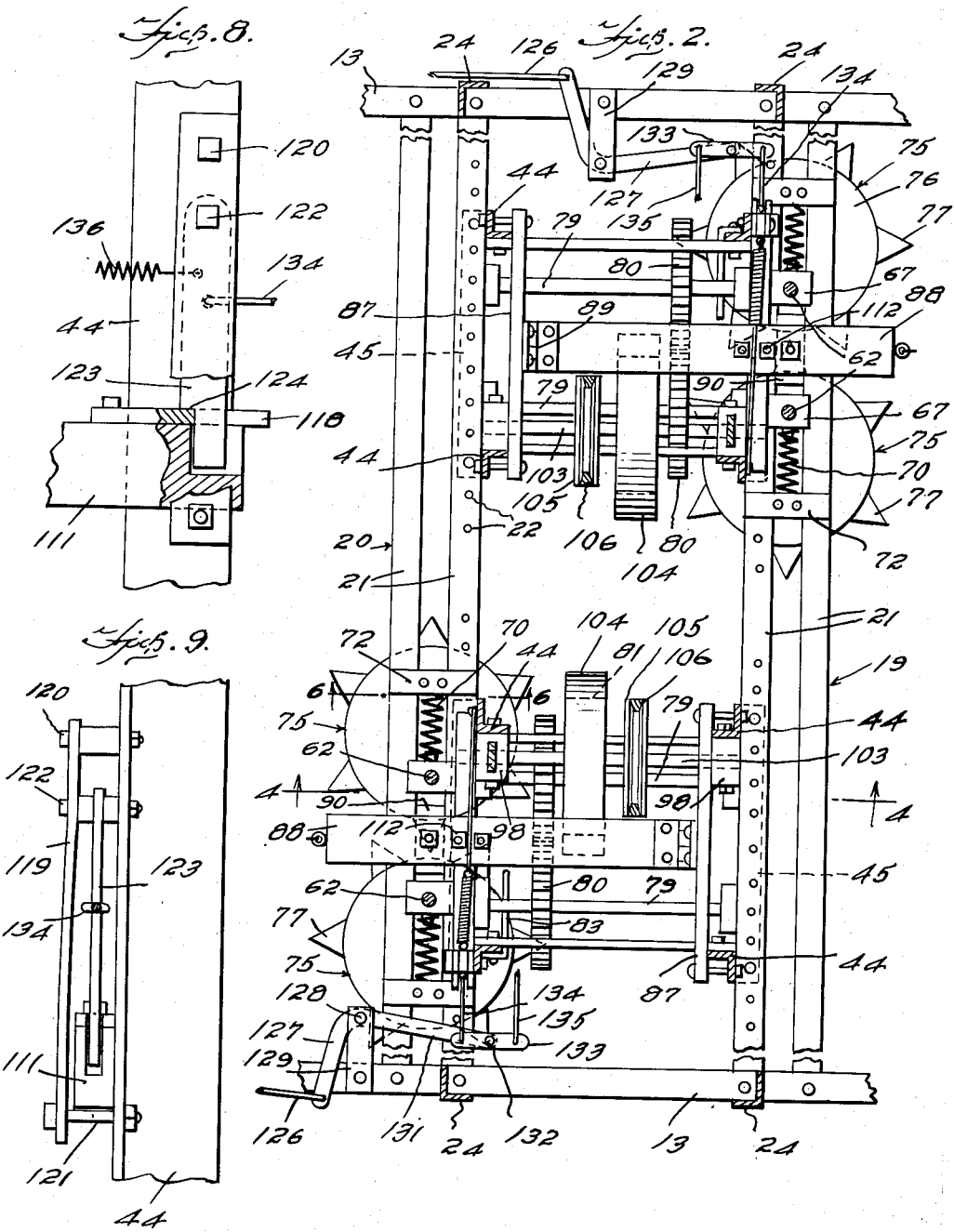

Dec. 22, 1953 J. E. RODE 2,663,237
COTTON CHOPPING MACHINE
Filed Dec. 29, 1949 4 Sheets-Sheet 3
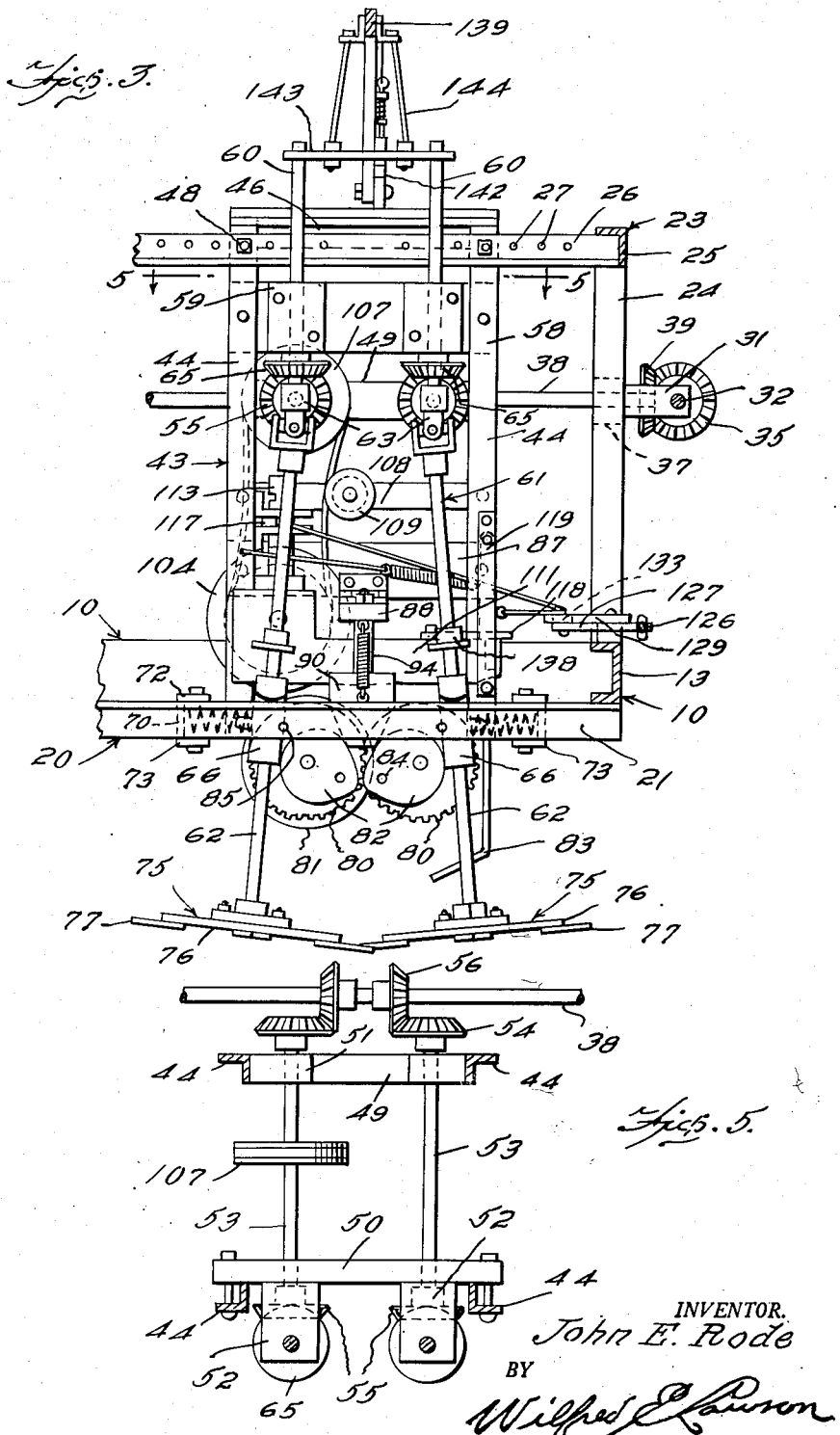
INVENTOR.
John E. Rode
BY
Wilfred E. Lawson
ATTORNEY Dec. 22, 1953    J. E. RODE    2,663,237
COTTON CHOPPING MACHINE
Filed Dec. 29, 1949    4 Sheets-Sheet 4
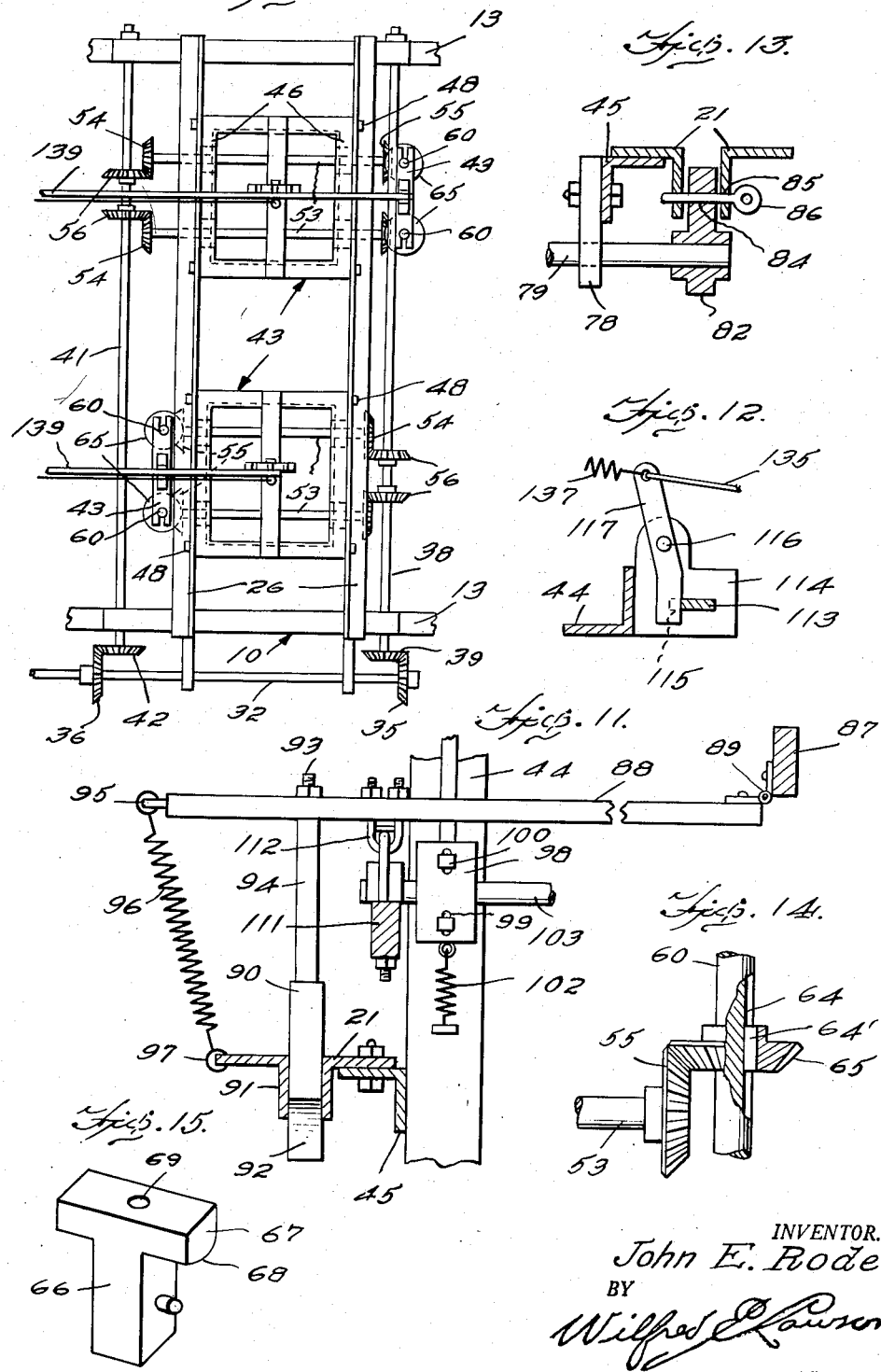
INVENTOR.
John E. Rode
BY
Wilfred E. Lawson
ATTORNEY Patented Dec. 22, 1953

2,663,237

UNITED STATES PATENT OFFICE 2,663,237

COTTON CHOPPING MACHINE

John E. Rode, Hillsboro, N. Dak.

Application December 29, 1949, Serial No. 135,638

10 Claims. (Cl. 97—17)

This invention relates generally to the class of agricultural machines and is directed particularly to and has as an important object the provision, of a machine which may be effectively employed as a cultivator, mulcher or plant chopper.

Another object of the invention is to provide a machine of the character stated, having cutting members which are normally in close cutting relation and positioned to travel along the opposite sides of a plant row, with means operable at the will of the machine operator to separate the cutting members to skip selected plants when thinning out a plant row.

It is a further object of the invention to provide a machine of the character stated employing a pair of cutting members mounted to travel along opposite sides of a plant row, with camming means mounted between such members to shift the same into ineffective positions when it is desired to skip a selected plant.

Still another object of the invention is to provide a machine of the character stated having cutting members mounted for travel along opposite sides of a plant row and supported for relative movement one toward the other in a general direction transversely of the row, with means for normally urging said members to move toward one another into a close working relation and other means designed to be set into operation at the will of the operator of the machine for shifting the cutting members against the action of the first means for the purpose of skipping selected plants.

A still further object of the invention is to provide a machine of the character stated employing coacting rotary pairs of cutter disks supported upon depending rotating shafts, with novel means for facilitating the vertical shifting of the shafts and the cutting disks to regulate the position of the disks with respect to the ground surface.

Another object of the invention is to provide a machine of the character stated wherein two pairs of rotatable cooperating disks are mounted in a shiftable frame on supports extending transversely of the line of travel of the machine, whereby the pairs of disks may be adjusted relative to one another transversely of such line of travel to work in plant rows which may be located close together or far apart.

Still another object of the invention is to provide in a machine of the character stated, cooperating rotating pairs of disks supported upon adjustably positioned frames which in turn are carried on a wheeled structure forwardly of an operating engine and the operator on the machine, whereby the operator has a clear unobstructed view of the disks together with a pointing or indicator means adjacent thereto, to enable him to determine accurately which plants are to be cut out and which are to remain in the row.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in side elevation of a machine constructed in accordance with the present invention.

Figure 2 is a horizontal section taken substantially on the line 2—2 of Figure 1.

Figure 3 is a vertical section taken transversely through the right side only of the machine, substantially on the line 3—3 of Figure 1.

Figure 4 is a vertical section taken in longitudinal plane substantially on the line 4—4 of Figure 2.

Figure 5 is a horizontal section taken substantially on the line 5—5 of Figure 3.

Figure 6 is a sectional view taken approximately on the line 6—6 of Figure 2 showing the mounting of the spring and retaining means therefor for a cam block.

Figure 7 is an enlarged detail view showing, partly in side elevation and partly in section, the bearing block and latching means for the friction driving wheel shaft.

Figure 8 is a detail view on an enlarged scale, partly in elevation and partly in section, of the holding latch for the lift bar.

Figure 9 is a view on an enlarged scale illustrating the mounting for the lift bar holding latch.

Figure 10 is a view in top plan of the machine showing only those elements in the top portion of the structure.

Figure 11 is a detail section on an enlarged scale illustrating the connections between the cam block and the shiftable shaft operating means.

Figure 12 is a horizontal section taken substantially on the line 12—12 of Figure 7.

Figure 13 is a detail section through a cam and the adjacent pair of beams showing the cam locking means.

Figure 14 is a detail view partly in section of a pair of meshed gears coupling a vertical earth working implement operating shaft and the power transmitting shaft therefor.

Figure 15 is a perspective view of a cam block.

The present application is a continuation in part of application Serial No. 71,427, filed January 18, 1949, for patent on Agricultural Machine, now abandoned.

Referring more particularly to the drawings the numeral 10 generally designates the chassis frame for a wheeled supporting structure for the mechanism of the present machine. At the forward end of the chassis frame are shown conventional front wheels 11 of a steerable type while the numeral 12 designates the rear supporting and drive wheels.

The chassis frame comprises the usual two side beams 13 and supported on the frame at the rear thereof is a motor driving unit 14 having a power take-off shaft 15 here illustrated as carrying a cone pulley 16.

The numeral 17 designates a driver or operator's seat for the present machine and the numeral 18 generally designates a conventional type of steering mechanism which is connected with the front wheels 11 in a suitable manner.

In accordance with the present invention there are mounted transversely of the chassis frame between the beams 13 thereof, front and rear ways 19 and 20 respectively. Each pair of ways consists of two angle beams 21 arranged in spaced parallel relation. The two beams 21 making up each pair are positioned so that each has one flange vertical and the other flange horizontal and the horizontally disposed flanges are oppositely directed so that the vertical flanges depend therefrom in spaced relation as is clearly shown in Figures 4 and 6.

The rear beam 21 of the forward pair and the front beam 21 of the rearward pair, is provided in the horizontal flange or web portion thereof with the longitudinal series of bolt openings 22 for the purpose hereinafter pointed out.

Supported upon the chassis frame between the two sides 13 thereof is a bridge structure 23 which is fixed to overlie the two pairs of ways 19 and 20. This bridge structure comprises, at each side of the machine frame 10, a pair of vertical, spaced posts 24 each of which is secured at its lower end to a side 13 of the machine frame and at their upper ends are connected together by the horizontal longitudinal extending bars 25. The posts 24 at one side of the machine frame are connected at their upper ends with corresponding posts at the opposite side of the frame by the transverse angle bar rails 26, each of which has one flange or web thereof vertically disposed and provided with bolt openings 27 for the purpose hereinafter pointed out.

Extending downwardly from each of the rear posts 24 to the adjacent side beam 13 of the chassis frame is a brace beam 28.

Upon one side of the machine, here shown as the right side, a standard 29 is located at the rear end of the chassis frame which supports upon its upper end a shaft bearing 30.

On the same side of the machine, the posts 24 carry bearing brackets 31 which are aligned with the bearing 30. The bearing 30 and the brackets 31 rotatably support the longitudinally extending power shaft 32 which, at its rear end, carries the cone pulley unit 33.

The cone pulleys 16 and 33 are connected by the belt 34 and it will be seen upon reference to Figure 1 that with the pulleys arranged in reversed relation as shown different driving speeds may be transmitted to the shaft 32 from the power unit shaft 15.

The power shaft 32 carries adjacent to the forward end the two miter gears 35 and 36. The gear 35 is located forwardly of the forward post 24 while the rearmost gear 36 is disposed rearwardly of the rear post 34.

The two front posts 24 of the bridge structure carry bearings 37 which support the front transversely extending counter shaft 38 which at the end adjacent to the right hand side of the machine, carries the miter gear 39 which meshes with the front gear 35.

The two rear posts 24 of the bridge structure also carry bearings which are designated 40 and these bearings support the rear transverse counter shaft 41 which upon the end adjacent to the right hand side of the machine carries a miter gear 42 which is in mesh with the gear 36.

The ways 19 and 20 which extend transversely of the frame support two movable frame structures each of which is generally designated 43. Each of these frame structures carries a pair of the hereinafter described earth working units together with the means for driving the same and for shifting them relative to one another as desired. Each of the movable frame units 43 is the same as the other in construction and carries the same mechanism and both are mounted directly upon the adjacent or innermost beams 21 for sliding adjustment transversely of the vehicle frame as hereinafter described, except that one frame and its mechanism is reversed in position from the other so that the earth working disks carried by one frame are disposed forwardly of the disks of the other frame thus making it possible to move the two pairs of earth working disks close together for operation upon closely spaced rows of plants.

Since the movable frame structures 43 are alike the description of one will apply to the other and accordingly the description will be applied to a single structure only.

Figure 3 illustrates the frame structure 43 which is upon the right hand side of the machine and as seen when looking forwardly from the machine operator's or driver's position. As shown the frame structure comprises four corner uprights 44 connected at their lower ends by the angle irons 45, each of which has one flange horizontally disposed and directed outwardly from the frame structure.

The upper ends of the frame corner posts 44 are likewise connected by the top transversely extending angle irons 46 each of which has a flange or web thereof extending upwardly, as best seen in Figure 1.

The frame structure 43 is supported by and between the innermost, or adjacent, transverse beams 21 by positioning the horizontally disposed flanges of the lower angle irons 45 beneath the horizontally arranged edge opposed flanges of the inner or adjacent beams 21, as shown in Figure 4.

The flanges of the lower beams 45 have passed therethrough the securing bolts 47 which are extended through selective ones of the openings 22.

The upper transverse angle irons 46 are disposed at the proper position to position against the vertically disposed flanges of the transverse top rails 26 of the bridge structure and such irons 46 are secured to the adjacent rails of the bridge structure by bolts 48, passing through the holes 27 of the rails as shown in Figure 3. Thus it will be seen that by the provision of the holes 27 in the top rails 26 and the bolt holes 22 in the transverse beams 21, adjustment of the frame structure 43 transversely of the machine can be readily effected.

Disposed transversely of the two forward corner posts 44 of the frame structure 43 and secured to such posts, is a plate 49 while at the same elevation the other two posts 44 have disposed thereacross and secured thereto a corresponding plate 50. These plates carry the two bearings 51, on the plate 49 and two corresponding bearings 52 on the plate 50, each of the bearings of one plate being aligned longitudinally of the machine with a bearing of the other plate.

Each two longitudinally aligned bearings 51—52 rotatably supports a short longitudinally directed shaft 53. These shafts are in the horizontal plant of the transverse counter shafts 38 and 41. Each of the shafts 53 carries upon its two ends the bevel gears 54 and 55.

In the shiftable frame structure 43 mounted on the right hand side of the machine, as seen in Figure 3, the gears 54 are upon the forward ends of the shafts 53 and are coupled with the countershaft 38 by bevel gears 56. However, in the frame structure at the left hand side of the machine, which is in reversed position from that at the right, these gears 54 would be on the rearward ends of the shafts 53 and would be operatively coupled with the rear countershaft 41 by means of bevel gears 57 carried by that shaft.

Connected across between the two corner posts 44 adjacent to the plate 50, but at a higher elevation than this plate, is the second transversely directed bearing plate 58 upon which is secured the pair of spaced parallel vertical bearings 59.

Extending vertically through each of the bearings 59 is the upper shaft section 60 of a two part cutter rotating shaft which is generally designated 61, the lower section of which shaft is designated 62. These shaft sections 60 and 62 are coupled together by a universal coupling 63 which is disposed beneath the adjacent vertical bearing 59 as shown in Figure 3.

Each of the upper shaft sections 60 is provided with the longitudinal keyway 64 and mounted upon such shaft section is a bevel gear 65 carrying a key 64' which engages in the keyway or slot 64 as shown in Figure 9. The gears 65 are disposed beneath the vertical bearings 59 and mesh with the top part of the adjacent gear 55. Thus it will be seen that the shaft sections 60 can slide freely vertically without affecting the coupling between the gears 65 and 55.

The lower shaft section 62 of each of the shafts 61 is slidably extended longitudinally through a relatively long cam follower block 66. These blocks are disposed between the two transverse beams 21 adjacent to the shafts 61 and are provided at their upper ends with laterally extending wings 67 which overlie the adjacent beams 21 and having their underfaces rounded as indicated at 68, Figure 15, to rest upon the top of the adjacent beam 21 and to have rocking movement thereon in addition to sliding movement longitudinally of the beams.

Each block has a longitudinal bore 69 therethrough, through which the lower shaft section 62 freely extends. Thus it will be seen that the shafts 61 can be raised and lowered, by means hereinafter described, without disturbing the positions of the gears 55 and 65, as previously stated, and also without causing any up and down movement of the camming blocks 66.

The lower shaft sections 62 of each of the movable structures are normally urged to swing toward one another by means of spring members 70 which are interposed between the outer or remote sides of the two blocks of each adjustable unit, and a stop plate 71 which is interposed between the pair of beams 21. Such stop plate 71 is secured to an edge of an upper clamp plate 72 which rests upon the tops or extends across the beams 21, and a lower clamp plate 73 which underlies the beams, these clamp plates 72 and 73 being joined together by the vertical coupling bolts 74 as shown in Figure 6.

Upon the lower end of each section 62 of each pair of shafts 61 is secured an earth working member which is generally designated 75. Such member is here shown as comprising a disk 76 to the center of which the lower end of the shaft section 62 is suitably secured, whereby such shaft section is perpendicular to the face of the disk. The peripheral portion of the disk has secured thereto the radially outwardly extending cutting teeth 77. These teeth cooperate to work the earth or cut out undesired plants as the machine moves along the plant rows, the machine being so positioned, or the adjustable frames 43 being so arranged, that the center of each plant row will pass midway between the adjacent edges of the disk members or earth working units 75.

Each of the two transversely directed bottom bars 45 of the movable frame unit 43 carries two depending bearings 78. Each bearing 78 of one bar 45 is aligned longitudinally of the machine with a bearing 78 of the other bar 45, forming a pair and each pair of bearings 78 rotatably supports the longitudinally directed cam shaft 79, shown in Figure 4.

Secured to these shafts 79 are the two meshing gears 80 and one of the shafts carries a friction drum 81 to which driving power is transmitted in the manner hereinafter described.

The shafts 79 have secured upon the ends which are adjacent to the upright earth working unit carrying shafts 61, the cams 82. These cams are arranged in the vertical plane of the adjacent cam blocks 66 and the two cams are disposed between the cam blocks so that when the cams are rotated they will force the cam blocks outwardly against the resistance of the springs 70 as will be readily apparent upon reference to Figure 3. By this means the earth working elements 75 may be caused to move outwardly away from the center of the plant row, when desired, to skip selected plants.

In order to facilitate the operation of the mechanism or, in other words, to assist the operator in selecting the plants to be skipped and also in setting the mechanism into operation at the proper moment to skip the selected plant, there is provided the depending wand or pointer 83 which is carried upon the movable frame structure and extends downwardly to terminate above the center of the plant row and at the proper distance in advance of the elements 75. It will be understood, of course, that when the adjustable unit frame 43 and parts carried thereby is turned around to be positioned upon the left hand side of the machine from the position in which it is shown at the right hand side and in Figure 3, this pointer may be changed or shifted so that it will still be ahead of the cutters or earth working elements.

When it is desired to use the machine for cultivating purposes only, the cams 82 may be secured against rotation, for which purpose each cam is provided near the high point thereof, with a hole 84, and a corresponding hole 85 is formed through the vertical web portion of an adjacent beam 21, to receive a locking pin 86 when the holes 84 and 85 are brought into alignment. When the holes are in such position it will be seen that the cams will be secured in a position where the cam blocks will be pushed out against and compress the springs 70, thereby separating the cutters 75 to let the plants pass between the same while the blades 77 work the ground at the sides of the plant.

The mechanism for effecting the desired separation of the earth working elements 75 is carried entirely upon the movable frame unit 43 and is constructed as follows.

Secured horizontally between the two corner posts 44 which are remote from the shafts 61, is a plate 87 which has pivotally attached to the face thereof which is nearest to the shafts 61, the relatively long longitudinally extending arm 88. The pivotal connection between the end of the arm 88 and the plate 87 is here shown as being in the form of a hinge 89 but it will be apparent that any other suitable pivotal coupling may be employed whereby the free end of the arm can swing in a vertical arc.

At its other end the arm 88, which will be hereinafter identified as the cam block supporting arm, has suspended therefrom a long block member 90 which has a thickness slightly less than the space between the adjacent beams 21 across which the arm extends. This block extends down between the beams 21 and at its lower end it is tapered to provide the inclined cam engaging shoulders 92. As shown in Figure 3 the tapered end of the block 90 is directed downwardly between the cams 82 so that such cams upon rotation have their high points moved upwardly against the overlying shoulders 92 of the cam block. The cam block 90 may be connected with the arm 88 in any suitable manner, the connection here shown comprising a bolt 93 which is secured at its upper end to the arm 88 and which passes downwardly through a spacing sleeve 94 into the upper end of the block 90.

At the extreme outer end of the arm 88 there is attached, at the point 95, an end of a pull spring 96 which extends downwardly and has its other end attached as at 97 to the adjacent beam 21.

Each of the two corner posts 44 which are at the inner side of the movable frame unit 43 and are spaced longitudinally of the machine, supports upon its inner side, a shaft bearing 98. As shown in Figures 4 and 7 each of these bearings, or bearing blocks, has therethrough the two bolt passages 99 which are approximately elliptical in cross section and have their long axes arranged vertically. Through each of these passages passes a supporting bolt 100 which is secured to the adjacent post 44. With this arrangement each bearing block is free to move slightly vertically.

Beneath each bearing block 98 the supporting post 44 carries a bracket 101 and between this bracket and the underside of the adjacent block 98 a spring is connected as indicated at 102, which constantly tends to move the bearing block downwardly.

Extending longitudinally of the machine between the bearing blocks 98 is a shaft 103 upon which is mounted a friction wheel 104 and a belt pulley 105. The friction wheel 104 is in the vertical plane of the first mentioned friction wheel 81 and is adapted, upon predetermined downward movement of the shaft 103, to frictionally engage the wheel 81 to transmit driving movement to the same.

Rotary motion is delivered to the shaft 103 through the medium of the pulley 105, a belt 106 passing therearound and a corresponding pulley 107 which is mounted upon the overlying one of the pair of shafts 53.

Upon a suitable support 108 carried by and between the corner posts 44 remote from the shafts 63, is pivotally mounted an idler pulley 109 across one side of which one run of the belt 106 passes.

The friction drums 104 and 81 are, in the assembly as shown in Figure 3, in spaced or separated relation, the drum 104 being raised slightly from the lower drum 81 so that no rotary power can be transmitted to the gears 80 and the cams 82. The power delivering belt 106 is accordingly slack.

The shaft 103 and the drum 104 are maintained in the elevated position shown by the following parts.

The end of the shaft 103 adjacent to the shafts 63, is engaged in a bearing 110 which is carried upon one end of a latched bar 111. This bar 111 is disposed in a transverse direction across the outer sides of the two corner posts 44 nearest to the shafts 63 and it extends across and below the arm 88. The arm 88 and the bar 111 extending thereacross are loosely coupled together by the two interconnected U-bolts 112 as shown in Figure 11.

The bearing block 98 which is adjacent to the bar 111, has secured to its top, the upwardly extending flat latch bar 113 which passes through slots in vertically spaced guide brackets 114. The latch bar 113 has a notch 115 in the edge thereof and one of the brackets has pivoted thereon as at 116, Figures 7 and 12, a latch dog 117, an end edge of which engages in the notch of the latch bar 113 to maintain the latter, with the block 98, in raised position.

The opposite end of the bar 111 has secured to the top thereof the longitudinally projecting bifurcated latch plate 118. This end of the bar 111 which carries the bifurcated latch plate 118, extends between the adjacent corner post 44 and a guide plate 119 which is attached at its upper end to the post 44 by the bolt 120 and at its lower end is connected to the post 44 by the bolt 121 which passes across the underside of the bar 111, as shown in Figures 8 and 9. The bolt 121 functions as a rest or stop for the end of the bar 111, limiting the downward movement thereof.

Below the bolt 120 is a parallel bolt 122 connected between the guide plate 119 and the post 44, upon which is swingingly mounted the hanging latch finger 123. This latch finger adjacent to its lower end is cut out to provide the shoulder 124 which, when the portion of the finger below the shoulder is in the furcation of the plate 118, engages over the top of the plate to hold the free end of the latched bar 111 down.

When the frame of the bar 111 is held down by the latch finger 123 and the opposite end together with the bearing blocks 98, is held up by the latching pawl 117, the friction drums are disengaged and the springs 102 are stretched or under tension. When the engine 14 is running and the drive shaft 32 rotating, the longiudinally directed gear shafts 53 and the shaft 103 will be in constant rotation. Likewise, since the shafts 63 are coupled at all times with the shafts 38 or 41 the earth working elements 75 will be rotating constantly and when lowered to the proper extent will function either to cut out plants or to work or mulch the ground.

When the elements 75 are in the working relation shown in Figure 3 the cam shafts 79, gears 80 and cams 82 will be stationary but when the driving friction drum 104 is lowered into contact with the driven drum 81 rotary motion will be transmitted to the shafts 79 to turn the cams or eccentrics 82 to impart outward thrust upon the cam blocks 66 and thus separate the elements 75.

The release of the latch pawl 117 and finger 123 is effected by the operator of the machine by depressing the foot pedal 125, Figure 1, which functions to pull the cable 126 which is attached to one arm of a bell crank 127 which is pivotally mounted at 128 on a bracket 129 which is secured to the adjacent side member 13 of the chassis frame.

The arm of the bell crank 127 to which the cable 126 is attached, is designated 130 while the opposite arm of the bell crank is designated 131. This arm 131 has pivotally mounted thereon as at 132, the short plate 133 and to one end of this plate is connected an end of a pull rod or wire 134 which is attached to the latch finger 123. At the other end of the plate 133, upon the opposite side of the pivot point 132 from the pull wire 134, is attached an end of a second pull wire which is designated 135 and this second pull wire is attached at its other end to the latching pawl 117.

The latching finger 123 has secured thereto one end of a spring 136, the other end of which is attached to a suitable fixed part of the frame structure 43 while the latching pawl 117 has attached to the outer end thereof, an end of a corresponding spring 137, the other end of which is likewise attached to a fixed part of the frame 43. These springs 136 and 137 are normally under light tension but when the bell crank is actuated by the foot lever or pedal 125, the wires or rods 134 and 135 will be pulled to disengage the finger 123 and pawl 117 from the elements which they normally retain in fixed position and the springs will be placed under increased tension. When the pawl and finger are shifted as stated, the shaft supporting end of the bar 111 will drop or be pulled down by the tensioned spring 102 so that the cams 82 will be at once set into motion. The spring 96 pulls down upon the arm 88 to assist the downward movement of the bar 111 by the connected U-bolts 112 thus pressing the tapered end of the block 90 down against the cam faces.

The rotating cams 82 turn inwardly and upwardly against the tapered faces 92 of the block 90 thus elevating the block and the free end of the arm 88 and also raising the free end of the bar 111 above the shoulder 124 of finger 123. This places the spring 96 under increased tension and elevates the released free end of the bar 111, the opposite end of the bar, with which the shaft 103 is connected, remaining down. After the points of the cams pass outwardly from contact with the inclined faces 92 of the block 90 the tension spring 96 will pull down on the arm 88 and cause the elevated end of the bar 111 to be forcibly thrown down so that such end will be reengaged or secured beneath the shoulder 124 of the latch finger 123. The cams continue rotating, the high points moving outwardly and downwardly to press against and force outwardly and apart the cam blocks 66, thus also swinging outwardly the lower shaft sections 62 of the rotating shafts 63. This separates the elements 75 so that the desired plant is skipped.

The cams continue to rotate and again come around to a position where the points thrust upwardly against the lower end of the block 90. Since the free end of the bar 111 is now held down by the finger 123, the opposite end with which the shaft 103 is connected, will be elevated and this action simultaneously effects the engagement of the latching pawl 117 in the notch of the latch bar 113 so as to hold the shaft elevated and also frees the driving friction wheel 104 from the wheel 81.

As will be readily apparent, after the pull upon the pedal operated cable 126 is released the tensioned springs 136 and 137 will pull the finger 123 and pawl 117 respectively back to position ready for engagement with the adjacent elements.

In the illustration of the earth working element driving means and the movable supporting frame 43, in Figure 3, the elements 75 are shown as being in raised position. The downward movement of the shafts 63 is limited by the fixed collars 138 carried by the lower shaft sections 62, which collars contact the tops of the adjacent cam blocks 66 to prevent the elements 75 from moving downwardly beyond a desired position.

Lifting or elevating of the shafts 63 is effected by means of a long lever 139 which has at its forward end a depending leg 140 which is pivoted at 141 to the center of a toothed segment 142 which is mounted upon the top of the frame structure 43. The adjacent two shaft sections 60 are connected by a cross head 143 and the central part of this cross head is coupled to the overlying lever 139 by the link 144. The position of the lever 139 is maintained by means of a conventional hand grip operated pawl 145 which engages the tooth segment 142 as will be readily apparent.

It will be readily apparent from the foregoing that the two structures carried by the frame 43 may be interchanged from one side of the machine to the other, with the ground working elements 75 of one structure placed toward the front and the other pair of elements 75 toward the rear as shown in Figure 2. With this arrangement the structures may be shifted toward or away from another in a direction transversely of the machine frame, in accordance with the spacing of the rows of plants upon which the cutters are intended to operate.

It will also be seen that while the ground working elements 75, continuously rotating, the elements of each pair may be easily and quickly caused to separate for the purpose of passing or skipping those plants in the row which are selected to remain.

I claim:

1. An agricultural machine comprising a body structure designed to be moved over the ground and including longitudinal side rails, a pair of beams disposed in relatively closely spaced parallel relation and extending transversely of and supported by said side rails, a pair of upright shafts, means carried by said body and rotatably supporting the shafts, the shafts extending downwardly between the pair of beams, an earth working implement supported upon the lower end of each shaft for rotation thereby, a pair of cam blocks disposed between the pair of beams, each of said cam blocks having a vertical passage therethrough through which the lower end of a shaft slidably extends, resilient means normally urging said cam blocks toward one another, said shafts being articulated whereby the lower end portions may have relative movement with the cam blocks, a pair of rotary cams disposed between the cam blocks and each adapted, when turned in one direction, to engage the adjacent block and force it outwardly against the action of said resilient means, a power source means rotatably coupling the cams with the power source, and means rotatably coupling the shafts with said power source.

2. An agricultural machine of the character stated in claim 1, wherein said shafts are supported for limited up and down movement, and means carried upon the body and connected with the shafts for effecting the raising and lowering of the shafts.

3. An agricultural machine of the character stated in claim 1, wherein the said shaft supporting means is supported on the beams for adjustment transversely of the body structure.

4. An agricultural machine comprising a portable body including longitudinal side rails, a frame carried by said rails, a counter shaft supported transversely of the body adjacent to said frame, means for transmitting rotary motion to the shaft, a pair of shafts rotatably supported on the frame to extend downwardly and terminating adjacent to the ground, a working element supported on the bottom end of each of the last mentioned shafts for rotation, a driving connection between the counter shaft and the last mentioned shafts said last mentioned shafts comprising an upper and a lower section and a universal coupling between the sections, the lower sections being relatively swingable in a direction transversely of the direction of travel of the machine, and movable elements interposed between said lower sections for effecting the separatory swinging of the lower sections.

5. An agricultural machine comprising a portable body including longitudinal side rails, a frame carried by said rails, a counter shaft supported transversely of the body adjacent to said frame, means for transmitting rotary motion to the shaft, a pair of shafts rotatably supported on the frame to extend downwardly and terminating adjacent to the ground, a working element supported on the bottom end of each of the last mentioned shafts for rotation, a driving connection between the counter shaft and the last mentioned shafts said last mentioned shafts comprising an upper section and a lower section and a universal coupling between the sections, the lower sections being relatively swingable in a direction transversely of the direction of travel of the machine, means for effecting the separatory swinging of the lower sections comprising a pair of cams disposed between the said lower sections and supported for rotation on parallel axes, a cam block on each lower section and supported for horizontal movement, the said lower sections being slidable through the blocks, resilient elements normally urging the blocks toward the cams, and a driving coupling between the cam shafts and the counter shafts.

6. An agricultural machine comprising a portable body, a bridge structure carried by and extending across the body, a pair of beams disposed horizontally across the body beneath said bridge structure, a vertical frame supported on the beams and coupled at its top with said bridge structure for position adjustment transversely of the body, a pair of shafts mounted in side by side relation on the frame to hang down therefrom, a working element upon the bottom end of each shaft, a countershaft supported on the bridge structure to extend across the body adjacent to the frame, means carried by the frame forming a driving coupling between the pair of shafts and the countershaft, and means for supplying rotary power to the countershaft.

7. An agricultural machine of the character stated in claim 6, in which each of the pair of shafts comprises an upper section and a lower section connected together by a universal coupling, the lower sections having free swinging movement in a direction transversely of the body, a guide block freely slidable on each lower section and supported on one of said beams, yielding elements normally urging said blocks toward one another, a pair of rotary cams between said blocks, said cams being coupled for unitary rotation in opposite directions to force the blocks and the lower shaft sections outwardly, a separable driving coupling between the cams and the countershaft, and means for selectively separating and establishing said coupling.

8. An agricultural machine of the character stated in claim 6, in which each of the pair of shafts comprises an upper section and a lower section connected together by a universal coupling, the lower sections having free swinging movement in a direction transversely of the body, a guide block freely slidable on each lower section and supported on one of said beams, yielding elements normally urging said blocks toward one another, a pair of rotary cams between said blocks, said cams being coupled for unitary rotation in opposite directions to force the blocks and the lower shaft sections outwardly, a separable driving coupling between the cams and the countershaft including a driven rotary member and a driving rotary member, means supporting the driving member for movement into and out of driving connection with the driven member, and mechanism operating automatically after the cams are set in motion and have applied outward thrust to and released the blocks, to break the driving coupling between the cams and the countershaft, comprising a shiftably supported cam block positioned for engagement by a cam to be moved to one position thereby following the said applied outward thrust to and release of the blocks and an operative connection between the said cam block and said movable driving member.

9. An agricultural machine, comprising a portable body, a frame structure thereon, a pair of shafts mounted in side by side relation on the frame to extend downwardly toward the ground, each shaft comprising an upper section and a lower section and a universal coupling between the sections, the upper section of each shaft being rigidly held for rotary movement and the lower section being free for rotary movement and also for swinging in a direction transversely of the body, a power delivering shaft, a driving coupling between the last named shaft and the upper section of each of the pair of shafts, a pair of coupled cam shafts supported at the lower part of the frame, a cam on each cam shaft, the cams being positioned between the lower shaft sections to rotate in the same plane and in opposite directions to thrust the said lower sections apart, an earth working element on the bottom end of each lower shaft section, a shiftable shaft, supporting bearings for the shiftable shaft mounted on the frame for up and down movement, a driving coupling between the shiftable shaft and the power delivering shaft, a friction wheel on the shiftable shaft, a friction wheel on a cam shaft in position to be engaged by the first friction wheel when the shiftable shaft is lowered, an elongate member supported on the frame for limited up and down movement and connected at one end with the shiftable shaft, a releasable spring retained latch holding the said one end of said elongate member in raised position, means for manually releasing said latch whereby the member and shiftable shaft are lowered, and a vertically movable element operatively coupled with said elongate member and positioned for engagement by said cams to have upward movement imparted thereto by the cams after the cams have applied outward thrust to the lower shaft sections and released the latter, to re-elevate the elongate member for re-engagement by said spring retained latch.

10. An agricultural machine of the character described, comprising a portable body, depending rotary shafts carried by and supported on the body for up and down movement, the shafts being divided into upper and lower portions, means coupling the upper and lower portions of each shaft whereby the lower portions have movement one with respect to the other in a direction laterally of the direction of travel of the portable body, the lower extremities of the shafts being at opposite sides of a plant row when the machine is in use, means operable at will for laterally swinging the lower portions of the shafts comprising a rotatable cam for each shaft and operatively engaged with the lower portion thereof, a drive member for and movable into and out of driving connection with the cams, a shiftable member operatively coupled with said drive member and engaged by the rotating cams to effect movement of the drive member out of connection with the cams, an automatically engaging latching mechanism for securing the drive member when it is moved out of said connection, manual releasing means for said latching mechanism, plant cutting means carried by the lower extremities of the lower portions of the shafts, means for rotating the shafts, and manual means connected with the shafts for effecting the up and down movement thereof while the shafts are rotating.

JOHN E. RODE.

References Cited in the file of this patent
UNITED STATES PATENTS

| Number | Name | Date |
|---|---|---|
| 980,803 | Lackie | Jan. 3, 1911 |
| 1,055,628 | Freeman | Mar. 11, 1913 |
| 1,349,266 | Cogburn | Aug. 10, 1920 |
| 1,515,012 | Davis | Nov. 11, 1924 |
| 1,581,404 | Smith | Apr. 20, 1926 |
| 1,776,830 | Chenault | Sept. 30, 1930 |